March 12, 1963

A. CHAUSSON 3,080,994

CLACK-VALVE PLUG, MORE PARTICULARLY FOR
COOLING RADIATORS OF MOTOR VEHICLES

Filed July 28, 1960

INVENTOR
ANDRÉ CHAUSSON

United States Patent Office 3,080,994
Patented Mar. 12, 1963

3,080,994
CLACK-VALVE PLUG, MORE PARTICULARLY FOR COOLING RADIATORS OF MOTOR VEHICLES
André Chausson, Asnieres, France, assignor to Societe Anonyme des Usines Chausson, Asnieres, France, a company of France
Filed July 28, 1960, Ser. No. 45,960
3 Claims. (Cl. 220—44)

As is well known, use is frequently made in the motor industry, of cooling radiators operating under pressure which have numerous advantages, more particularly owing to the fact that they afford a better heat output of the engine which can thus work at a high temperature.

Moreover, this type of radiator limits losses by evaporation of the cooling liquids.

In order to prevent excessive pressure from developing inside radiators, the latter are generally provided with safety-valves which limit the rise of pressure to a predetermined value. These valves are often fitted on the filler cap which also comprises a valve, called "depression," enabling a certain amount of air to be admitted into the radiator during cooling, this second valve obviously operating in a manner opposed to the safety-valve.

Up till now, these valve units have been made up of mechanical parts combined with calibrated springs and formed of units whose manufacture, while not raising technical problems, nevertheless has the drawback of being relatively expensive.

The present invention obviates this disadvantage by creating a new clack-valve plug extremely simple to make, and hence, cheap.

According to the invention, the plug is made of plastic material having a certain amount of elasticity, for example, of thermo-plastic material such a superpolyamid, and this plug delimits underneath a rod from whose end a valve is formed whose edges press against a seating of the part on which the plug is fixed and whose bottom at least has thin walls, so that it is distorted when a given pressure is applied underneath the clack-valve.

Various other characteristics of the invention will moreover be revealed by the detailed description which follows.

One form of embodiment of the purpose of the invention is shown, by way of non-restrictive example, in the attached drawing.

Figure 1:
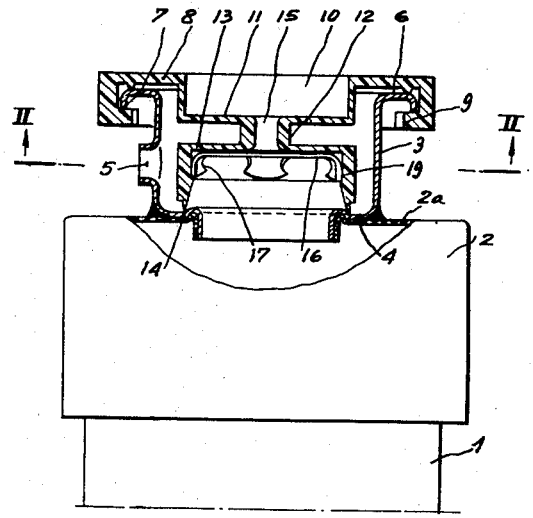
FIGURE 1 is an elevation cross-section of one form of making a radiator plug in accordance with the invention.
Figure 2:
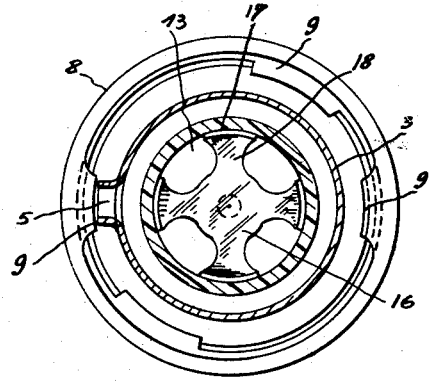
FIGURE 2 is a section taken along the line II—II of FIGURE 1.

According to the drawing, 1 denotes the nest of a radiator which comprises a water box or feed-tank 2 with whose interior there communicate the tubes which the nest 1 normally comprises. The top 2a of the water box supports a filler piping 3 which has an annular edge 4 intended to form a valve seat when the radiator comprising it is to operate under pressure, as is now frequently the case in the technique of cooling the engines of motor vehicles.

The piping 3 has an opening 5 laterally for the exit of steam when the pressure in the water box exceeds a certain value.

The upper part of the piping 3 forms a flange 6 and has turned-over edges 7 delimiting sloping parts for ensuring the fixing and tightening of a closing plug 8. This plug, which is made according to the invention of synthetic material and more particularly superpolyamid resin, such as is known under the name of "nylon," has ribs 9 at its periphery in the known manner, cooperating with the flanges 7 of the piping.

As can be clearly seen from the drawing, the plug has a hollow 10 at its top part, delimited by a bottom 11 of slight thickness, from which a rod 12 is formed connecting the bottom 11 to a cupola 13 which forms a clack-valve whose lower lip 14 is thin and presses against the peripheric edge 4 of the piping 3.

The wall 11 of the cap 8 and the top of the cupola 13 forming a clack-valve being thin, it follows that these two parts have an appreciable elasticity so that it is thus possible to apply the thin lip 14 of the clack-valve against the seating formed by the border 4 of the piping 3 by exerting a pressure on this seating which can be easily determined by suitably selecting the dimensions of the various parts of the plug.

As will be easily understood, this thus ensures the fluid-tightness of the seal formed by the plug.

As also shown in the drawing, the rod 12 and the bottom 11 are drilled with a hole 15 which goes right through the plug. This hole is normally closed by a flexible clack-valve 16 of rubber or other elastic material, which is introduced inside the clack-valve 13 in which it is fixed by reason of the embedding of the ends 17 of lugs 18 found in a groove 19 delimited at the bottom of the clack-valve 13.

As can be clearly seen from the preceding explanations, when the pressure in the radiator exceeds a predetermined value, this pressure which is applied to the interior of the clack-valve 13 has the effect of slightly raising the latter by elastically distorting the wall 11 of the plug as well as the top of the clack-valve 13. In this way, the excess steam contained in the water box 2 can escape through the opening 5 of the piping 3.

On the other hand, when the pressure lowers in the radiator 3 owing to the cooling of the liquid which it contains, a certain amount of air can enter the water box by lowering the flexible clack-valve 16, whose lugs 18 are very elastic.

The calibration of the clack-valve 13 can be regulated by altering the thickness of the bottom 11 of the plug as well as the thickness of the valve itself. Moreover, it is also possible to vary the calibration of this valve by carefully selecting the shape of the bottom 11 and/or that of the top of the valve.

The invention is not restricted to the example of embodiment shown and described in detail, for various modifications can be applied to it without going outside of its scope.

I claim:

1. A removable cap for a spout of an engine cooling radiator having a lateral discharge hole, comprising a cap having an upper covering portion arranged to fit the top of said spout said upper covering portion being peripherally shaped to enable successively locking and releasing of said cap from said spout by rotation of said cap, a downwardly extending extension having a bore open to the interior and exterior of the cap provided centrally on said upper portion, a resilient thin substantially flat ring integral with the lower portion of said extension and parallel to said upper covering portion, a downwardly extending crown shaped element projecting from the periphery of said ring and having a sharpened flexible lower edge for bearing against the bottom of said radiator spout to close the spout and prevent exit of steam through said lateral discharge hole, said thin ring and crown shaped element constituting a discharge valve, an abutting portion provided inwardly in said crown shaped element and a resilient diaphragm carried by said abutting portion to close the bore of said extension and constituting an air inlet valve.

2. A radiator cap according to claim 1 wherein said abutting portion of the crown shaped element comprises an annular rib inside said element and said resilient diaphragm is a cross shaped disc inserted inside the crown shaped element bearing against said rib and closing the bore of said extension.

3. A radiator cap according to claim 2 wherein said covering portion of said cap is also formed as a thin walled resilient member in the part immediately surrounding said extension.

References Cited in the file of this patent
UNITED STATES PATENTS

| | | |
|---|---|---|
| 549,678 | Miller | Nov. 12, 1895 |
| 1,637,821 | Heideman | Aug. 2, 1927 |
| 2,622,762 | Parsons | Dec. 23, 1952 |
| 2,661,019 | Snyder | Dec. 1, 1953 |
| 2,707,092 | Bowditch | Apr. 26, 1955 |
| 2,912,999 | Kersh | Nov. 17, 1959 |